United States Patent [19]
Humphrey

[11] Patent Number: 5,520,138
[45] Date of Patent: May 28, 1996

[54] AMPHIBIOUS BOAT

[76] Inventor: F. Harold Humphrey, 7 Orchard Street, Markham, Ontario, Canada, L3P 2S9

[21] Appl. No.: 342,611

[22] Filed: Nov. 21, 1994

[51] Int. Cl.$^6$ .................................................. B63C 13/00
[52] U.S. Cl. .................................. 114/344; 114/274
[58] Field of Search .................................. 114/344, 274, 114/282

[56] References Cited

U.S. PATENT DOCUMENTS

| | | | |
|---|---|---|---|
| 2,929,079 | 3/1960 | Totten | 114/344 |
| 2,954,569 | 10/1960 | McCord et al. | 114/344 |
| 3,537,117 | 11/1970 | Plesnevich | 114/344 |
| 3,755,838 | 9/1973 | Dunagan | 114/344 |
| 4,567,844 | 4/1986 | Johnson | 114/344 |

*Primary Examiner*—Sherman Basinger

[57] ABSTRACT

The present invention is directed to an amphibious boat. The boat includes retractable wheel assemblies secured either side of the boat and movable from a trailering position to a storage position. In a preferred embodiment, the wheel assemblies lock with hydrofoil members secured to the boat hull and effectively transfer loads to the boat hull when the wheel assemblies are in the trailering position. The hydrofoils serve to provide additional lift for the boat when appropriately driven through the water. The wheel assemblies also have a unique suspension arrangement of the wheels for improved trailering characteristics.

19 Claims, 4 Drawing Sheets

5,520,138

AMPHIBIOUS BOAT

BACKGROUND OF INVENTION

The present invention relates to amphibious boats and in particular relates to a combination boat and trailer arrangement.

There are a number of examples where removable or detachable wheels have been combined with a boat hull whereby the boat hull can act as its own trailer. In such examples, a trailer tongue is typically provided at the bow of the boat and detachable wheels are connected near the stern of the boat. Some of the prior art examples include recess pockets in the hull of the boat into which the wheels can collapse when the boat is in the water mode. Other examples have used pivoting wheel arrangements attached to the side of the boat which are moveable from a boat trailering position to a clear water mode position where the wheels and the support structure are well above the water line. The wheel assemblies are typically to the exterior of the boat and thus provide a wide stance suitable for trailering. Part of the problem with such structures is to provide sufficient structural strength to distribute the load exerted on the wheels to the boat hull when the boat is in the trailering position and used in the intended manner. Typically the wheel suspension arrangements for these amphibious type boats is limited and high shock loads can be transferred to the boat, for example, when the boat is being trailered and one of the wheels hits a pothole.

Many of the prior art attempts for an amphibious boat have serious drawbacks both in the trailering mode and in the water mode. The broad concept of a boat which can effectively be used in this manner continues to have merit but the structures to date to allow this be accomplished in an effective manner have been deficient or not fully accepted by the marketplace.

SUMMARY OF THE INVENTION

An amphibious boat according to the present invention comprises a boat hull and a pair of retractable wheel assemblies secured adjacent the stern of the boat hull and moveable from a locked trailering position with the wheel assemblies supporting the boat hull to a storage position with the wheel assemblies located above the water line of the boat hull whereby the boat hull can function in a conventional manner without interference from the retractable wheel assemblies. Each retractable wheel assembly includes a cantilevered member with one end pivotally secured to the boat hull with the opposite end supporting a wheel of the retractable wheel assembly. Each wheel assembly pivots about a pivotally secured end of the respective cantilevered arm when the assembly is moved from the storage position to the trailering position. Each wheel assembly includes a two part locking mechanism which locks the wheel assembly in the trailering position. The two part locking mechanism includes a first part on the retractable wheel assembly and a second part secured to the boat hull. This second part additionally defines a hydrofoil which provides lift to the boat hull when the boat hull is supported by and driven through the water at an appropriate speed.

Preferably the hydrofoil is attached to the bottom of the boat and thus the bottom of the boat serves to act as a structural strut between the two opposed wheel assemblies.

According to a preferred aspect of the invention, the cantilevered arm is generally upright in the trailering position. According to a further aspect of the invention, the cantilevered arm includes a spring biased trailing suspension arm with the suspension arm responding to various loads exerted by the road when the amphibious boat is used in the trailering position. In this way, the cantilevered arm is rigidly attached to the boat and a suspension is provided between the wheel and the cantilevered arm.

According to a further aspect of the invention, the cantilevered arm has an associated operating crank handle interior to the boat hull for moving the respective retractable wheel from the trailering position to the storage position.

According to yet a further aspect of the invention, each cantilevered arm includes a pivot shaft passing through a bearing in said boat hull generally adjacent the gunwale of the boat hull.

In a different aspect of the invention, the amphibious boat comprises a boat hull and a pair of retractable wheel assemblies secured adjacent the stern of the boat hull and moveable from a locked trailering position with the wheel assemblies supporting the boat hull to a storage position with the wheel assemblies located such that the boat hull can function in a conventional water mode manner without interference from the retractable wheel assemblies. Each retractable wheel assembly includes a strut member with one end pivotally secured to the boat hull with the opposite end supporting a wheel of the retractable wheel assembly. Each wheel assembly pivots about a pivotally secured end of the respective strut arm which moves between the storage and the trailering position. Each wheel assembly includes a two part locking mechanism which locks the wheel assembly in the trailering position. The two part locking mechanism includes a first part on the retractable wheel assembly and a second part secured to the boat hull. The second part is located below and spaced from the pivot connection of the strut arm to provide a strong securement of the strut arm to said boat hull in the trailering position. Each strut arm includes a trailing arm supporting a respective wheel and the trailing arm includes a suspension connection between the trailing arm and the strut arm. In this way, the strut arm can be held in a fixed position relative to the boat and the trailing arm can appropriately provide the suspension.

According to a preferred aspect of the invention, the second part of the two part locking mechanism is in the form of a hydrofoil located below the waterline to provide lift to the boat when the boat hull is driven through the water. Preferably the hydrofoil is directly attached to the bottom of the boat and the bottom of the boat acts as a structural member separating the two retractable wheel assemblies. Typically the retractable wheel assemblies are provided near the stern of the boat preferably between the transom and a reinforcing seat member which also serve to stiffen the boat adjacent the retractable wheel assemblies.

According to an aspect of the invention, the hydrofoil provided either side of the boat each includes a guide arrangement for guiding the first part to the locked trailering position.

According to yet a further aspect of the invention, the guide arrangement includes a tapered channel having a large mouth portion which receives and guides the first part into a tapered channel to a locked position. The tapered channel also provides a positive structural stop limiting any further movement of the first part in the direction entering the channel and thereby provides a positive stop mechanism limiting movement of the strut arm.

According to a further aspect of the invention, the guide arrangement has an undercut portion which is engaged by the first part when received in the guide arrangement and thereby provides a further releasable structural connection therebetween.

According to yet a further aspect of the invention, the first part includes a spring biased lock pin which engages the second part when the first part is moved to the trailering position and moves upwardly within the first part. The locked pin when the first part is moved to the trailering position enters due to a spring bias and locks with a locking recess provided in the second part. This arrangement also includes means for releasing of the pin from the lock recess.

According to yet a further aspect of the invention, the means for releasing the pin from the locking recess is a cable arrangement which is connected to the pin and is secured interior to the boat whereby tensioning of the cable arrangement moves the pin to the release position thereby freeing the wheel assembly to be released from the trailering position.

According to a further aspect of the invention, each strut is supported in a bearing arrangement adjacent a gunwale of the boat hull and includes a corresponding crank to the interior of the boat hull which is fixed relative to the strut arm whereby the crank arm can be used for moving the strut arm between the trailering and the storage positions.

According to yet a further aspect of the invention, a latch member is provided for each strut arm which cooperates with the locking pin for maintaining the strut arm in the storage position above the water line of the boat. Again the cable arrangement can be used to release the locking pin and thereby release the strut arm from the storage position.

BRIEF DESCRIPTION OF THE DRAWINGS

The preferred embodiments of the invention are shown in the drawings wherein.

Figure 1:
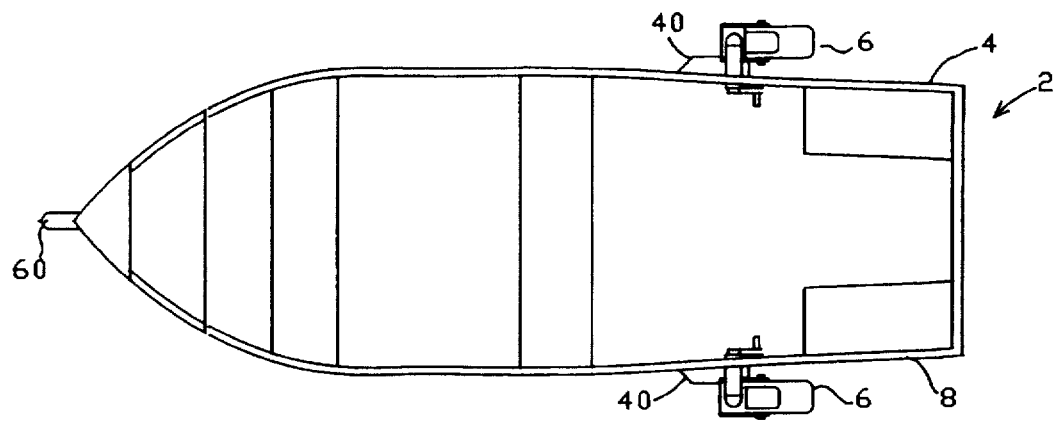
FIG. 1 is a top view of the boat with the retractable wheels in the trailering position.

DETAILED DESCRIPTION ACCORDING TO THE PREFERRED EMBODIMENTS OF THE PRESENT INVENTION

The amphibious boat 2 has a boat hull 4 with a pair of retractable wheel assemblies 6 either side of the boat hull. These retractable wheel assemblies are pivotally secured below the boat gunwales 8 and pivot around the pivot axis 10. The retractable wheel assemblies includes wheels 20. Each wheel is supported by cantilevered arm 22 pivotally secured to pivot about the axis 10 and includes a cantilevered locking arm 24 secured to cantilevered arm 22 by gusset 26. In this way, cantilevered arm 22 is disposed at an outwardly sloped angle and provides as wider wheel base for the amphibious boat in the trailering position. Each wheel 20 is secured to a respective cantilevered arm by means of a suspension or trailing arm 28. Suspension arm 28 is secured to the cantilevered arm 22 by a rubber suspension knuckle 30. This knuckle allows limited pivotal movement against an increasing spring bias when the suspension arm is forced in a rotating direction around the rubber suspension knuckle. The preferred arrangement is a multipurpose suspension unit which serves to define a bearing spring and vibration dampening arrangement. Such a suspension unit is sold by Rosta-Werk AG and is sold under the trade-mark THE BLUE ONES. The rubber suspension knuckle includes four prestressed rubber elements mounted in a square core with an interior square core being held in position by the rubber elements. Rotational movement of the inner core causes the compression of these rubber elements thus providing a spring bias urging the structure to the original condition.

Figure 3:
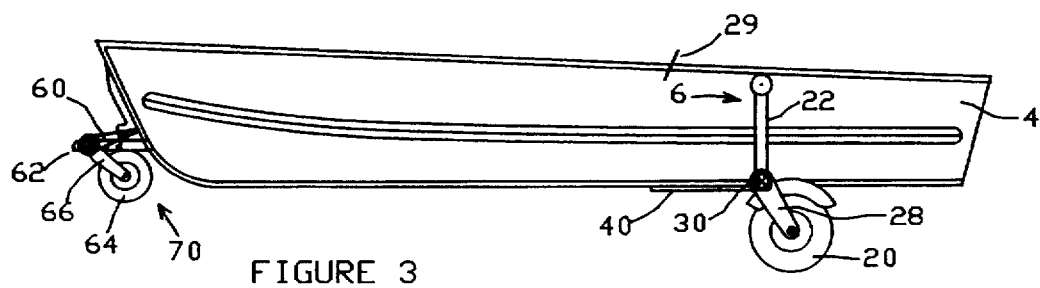
FIG. 3 is a side view with the wheels in a trailering position.
Figure 11:
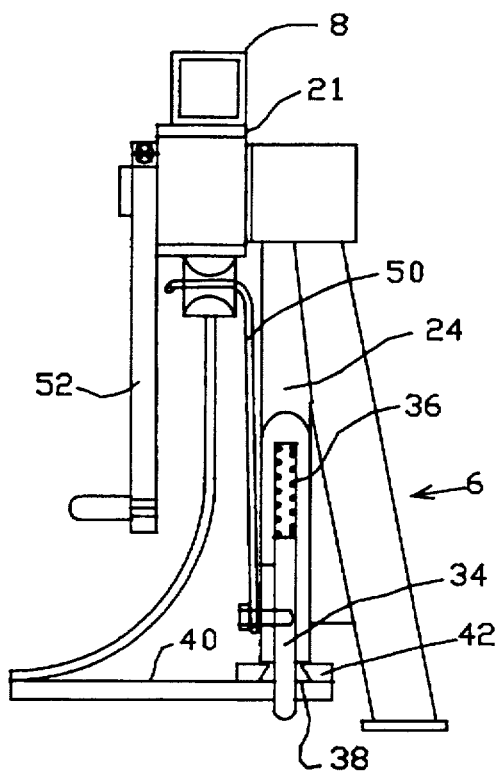
FIG. 11 is an end view showing details of the locking mechanism.
Figure 12:
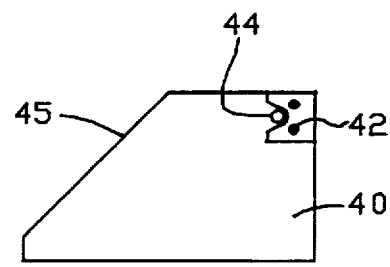
FIG. 12 is a top view of the hydrofoil.

The retractable wheel assemblies are shown in the trailer position in FIGS. 1, 3, 4, 6 and 7. As can be seen in FIG. 3, the cantilevered arm 22 is generally vertically orientated and is held in this trailering position by means of the cantilevered locking arm engaging and locking with the hydrofoil 40. Details of the locking arrangement are shown in FIG. 11. In this case, the locking pin 34 can move upwardly against the spring bias defined by spring 36. The locking pin 34 projects from the end of the cantilevered locking arm 24 and allows movement of the pin interior to the arm. The end of the cantilevered arm includes a dovetail end portion 38 which receives and cooperates with the retainer stop 42. It can be seen that the retainer stop 42 provided on the surface of the hydrofoil defines a final locking position where the locking pin can engage the locking port 44 provided in the hydrofoil. The retainer stop 42 is initially designed to loosely receive the dovetail end portion 38 and guide it to the locking position. In the locking position, the dovetail end is captured beneath appropriately shaped undercut shoulders of the retainer stop 42. In this way a strong mechanical connection is achieved and the cantilevered locking arm cannot move any further rearwardly as it is restricted by the retainer stop 42. Also there is positive engagement of the hydrofoil 40 and the cantilevered locking arm 42 to provide a strong mechanical connection of the wheel assembly to the boat hull in the trailering position.

Figure 2:
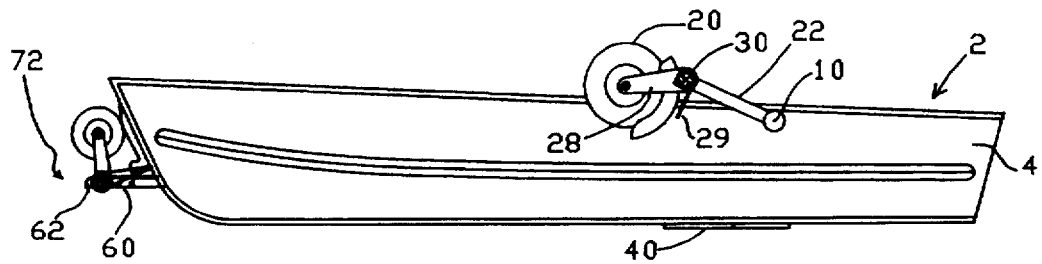
FIG. 2 is a side view of the boat with the wheels in the storage position.
Figure 5:
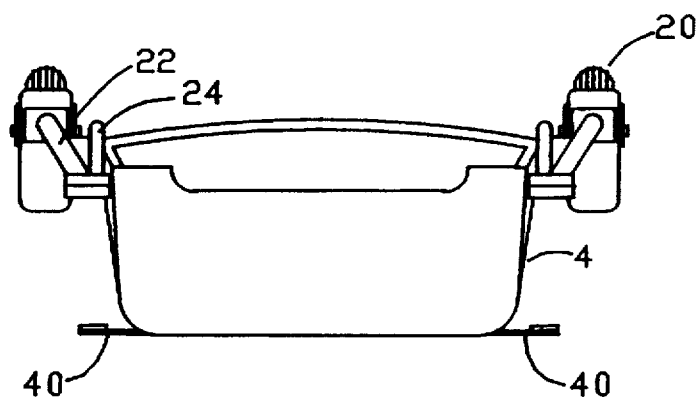
FIG. 5 is a stern view of the boat with the wheels in the storage position.
Figure 6:
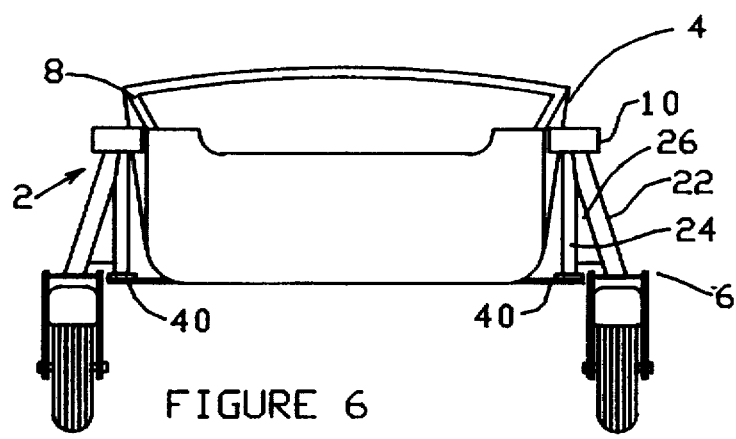
FIG. 6 is a stern view of the boat with the wheels in the trailering position.
Figure 7:
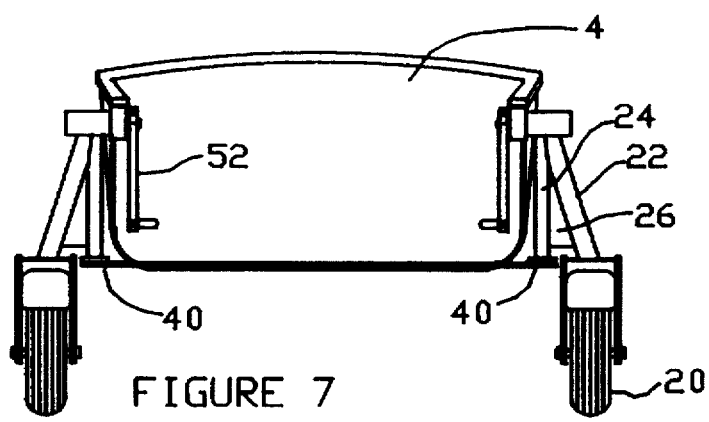
FIG. 7 is a stern cross sectional view with the wheels in the trailering position.
Figure 8:
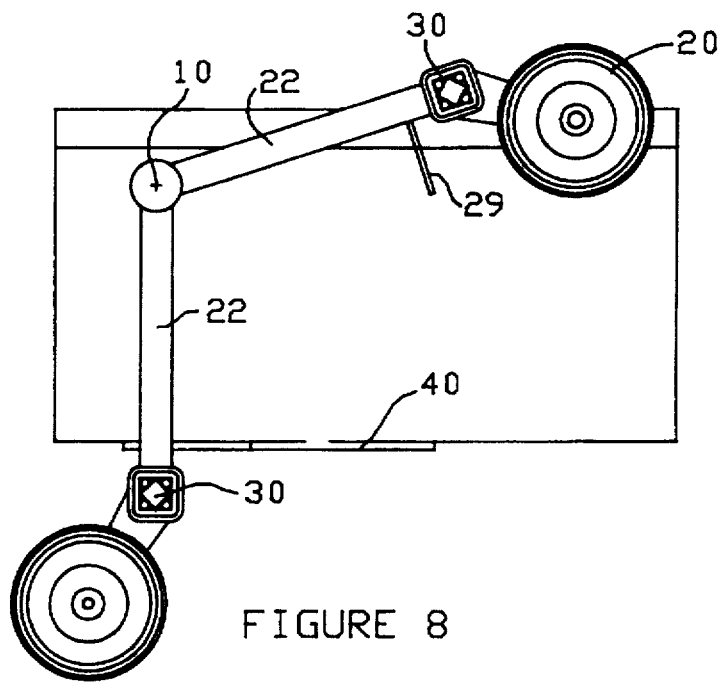
FIG. 8 is a side view with the wheels in a trailering position and in a storage position.

Each wheel assembly 6 includes an operating handle 52 provided to the interior of the boat. This operating handle is connected to a pivot shaft which is rigidly connected to the cantilevered arm. 22 and is received within a bearing 21 provided in the side of the boat immediately below the gunwale 8. This operating handle can be used to force the retractable wheel assembly to the locking position merely by appropriate movement of the operating handle 52. This is particularly valuable when the boat is in the water and the operator wishes to take the boat out of the water. He can then move the retractable wheel assemblies from the storage position of FIG. 2 by releasing the locking pin allowing the wheel assemblies to move downwardly under gravity until they strike the water. The user can then use the handle 52 to force the wheels to the trailering position of FIG. 3. Similarly the operating handle, when the wheels are in the trailering position and the boat is launched, can be used to move the wheel assemblies to the storage position of FIGS. 2 and 5. This is accomplished by releasing the locking pin 34 by tensioning the cable arrangement 50. This serves to draw the locking pin 34 upwardly into the cantilevered locking arm 24 and thus allows movement of the retractable wheel assemblies from the trailering position to the storage position. The locking pin 34 cooperates with a locking plate 29 provided at the gunwale and is cammed passed the locking plate forcing the pin against the spring bias and once the wheel assembly has reached the storage position the pin then clears the locking plate 29 and the wheel assemblies are retained in the storage position due to the pin engaging the upper edge of the locking plate. Release of the locking pin by means of tensioning the cable 50 can release the wheel assemblies from the storage position.

The amphibious boat includes two hydrofoils 40 provided either side of the boat and secured to the bottom of the hull. These hydrofoils serve to provide the second part of the locking mechanism and cooperate to define a strong triangulation configuration supporting the wheel assemblies in the trailering position. This triangular configuration is defined by the cantilevered arm 22, the boat hull between the bearing 21 and the hydrofoil 40. This triangulation serves to strengthen the boat hull adjacent the wheel assemblies and effectively distribute the load to the boat hull. The hydrofoils 40 also serve to provide a useful function to the boat, ie. they act as a traditional hydrofoil and thereby provide additional lift when the wheels are in the storage position and the boat is used in its intended marine application. The leading edge 45 of the hydrofoil acts as a camming surface for urging the locking pin upwardly into the cantilevered locking arm 24 when the wheel assembly is moved from the storage position to the trailering position. It is also possible to have the leading edge 45 and even the leading part of the hydrofoil made of a plastic type of material whereas the trailing part of the hydrofoil is preferable of a suitable metal or structural material to allow effective transmission of the loads to the boat hull. For example, the leading portion of the hydrofoil can be of polycarbonate plastic, such as LEXAN™, and in the event you strike a log in the water or some object it can be damaged as opposed to the entire hydrofoil or boat hull being damaged.

Figure 9:
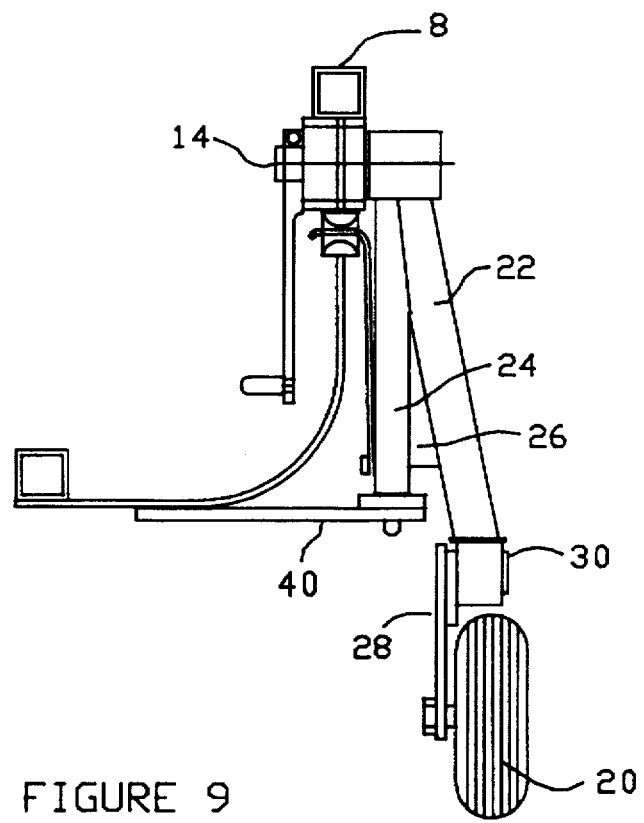
FIG. 9 is a partial end view showing the cooperation between the retractable wheel mechanism and a hydrofoil.
Figure 10:
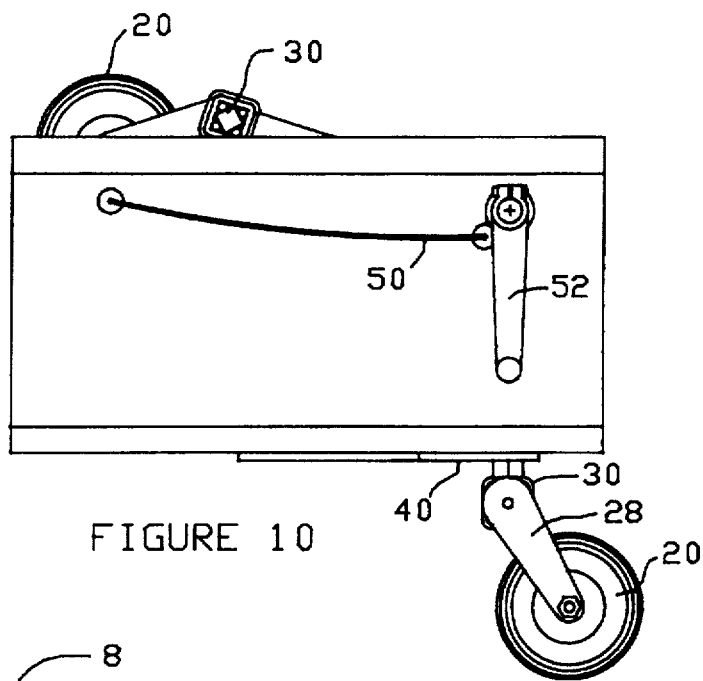
FIG. 10 is a partial side view showing the retractable wheel in the trailering position and the up position and the release mechanism interior to the boat.

The hydrofoil is shown in the end view of FIG. 9 and the side view of FIG. 10.

The boat also includes a trailer connection 60 provided at the bow of the boat which has a ball socket 62 for engaging a suitable ball trailering hitch. Associated with the trailer connection 60 is a moveable dolly wheel 64 supported on twin arms 66. The moveable dolly wheel is moveable from a dolly position to the marine position of FIG. 2. In the marine position the dolly wheel acts as a bumper for the trailer connection 60 in that it engages the bow of the boat and thus if a dock is hit it will typically also hit the wheel which acts as a bumper. The dolly position is generally shown as 70 in FIG. 3. In the dolly position 70, there is very little "tongue" weight on the dolly wheel. In this way the boat can be positioned adjacent a launching ramp and can be released from the trailer hitch and supported in the dolly mode. The boat is then moveable by a user to effectively launch the boat without backing up the car as the user may merely apply the appropriate force on the bow of the boat and direct the boat down the launching ramp. If desired, a suitable rope arrangement can be used to control movement of the boat down the launching ramp. It is also possible to use a rope arrangement to pull the boat out of the water. In this case all the wheels would be in the down position of FIG. 3 (dolly mode) and the user could back his car to a position generally in front of the loading ramp. A rope could then be attached between the car and the boat and the car could be driven forward thus pulling the boat up the launching ramp onto level ground. The car can then be backed up and the appropriate connection can be made between the trailer connection 60 and the trailer ball on the car hitch. This greatly simplifies the launching process and also assures that the boat is always aligned on the trailer as the trailer is integral with the boat. The light tongue weight allows the user to easily lift the bow of the boat as required.

This arrangement has particular application for small light weight boats such as aluminum utility boats or fishing boats where it is desirable to be able to quickly launch the boat, however it is not limited to this application. It can also be appreciated that since the wheels can be left in the storage position and the boat used in a marine application that should a short portage be necessary around a dam or through a shallow portion of a river, the wheels can be moved to the trailering mode and the boat manually wheeled through or around the obstacle. This arrangement also avoids the problem associated with storage of the trailer when the boat is in use.

When desired, it is also possible to have the wheel assemblies removed from the boat merely by allowing the pivot shaft 14 to be removed from the bearings. In this way the wheel assemblies may be separately stored, for example in a car trunk, and the boat used in the traditional marine application.

Figure 4:
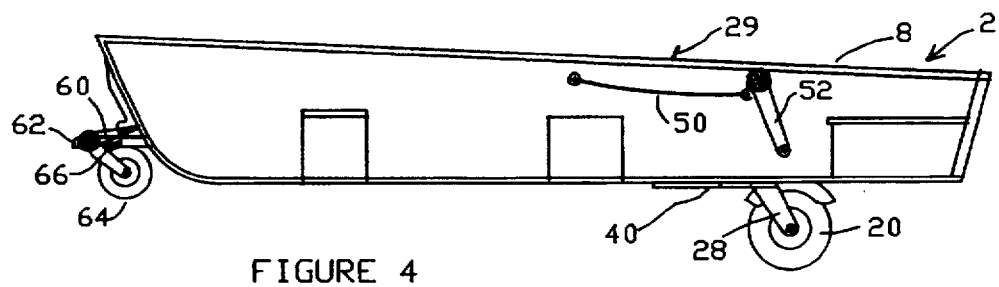
FIG. 4 is a side cross sectional view of the boat with the wheels in the trailering position.

From the sectional view of FIG. 4 and top view of FIG. 1, it can be seen that the retractable wheel assemblies are provided near the stern of the boat between the rear seats and a middle seat of the boat. Thus they are typically attached in a fairly stiff section of the boat. Similarly the hydrofoils 44 are preferably attached in a stiff section of the bottom portion of the boat or reinforce a bottom section to make it suitable. If necessary, additional reinforcing can be provided at the bottom of the boat on the interior. Furthermore, if necessary, although it is not normally needed, a trailering member can be positioned between the bearings either side of the boat such that there is no substantial flexing of the sidewalls. This has not been found necessary in many applications particularly in light applications.

Although the invention has particular applications with respect to small utility boats such as 12, 14 and 16 foot aluminum and fibreglass boats, it also has application with larger boats and is not limited to the preferred embodiment shown.

Although preferred embodiments of the present invention have been disclosed in detail, it will be understood by those skilled in the art, that variations may be made thereto without departing from the spirit of the invention or the scope of the appended claims.

The embodiments of the invention in which an exclusive property or privilege is claimed are defined as follows:

1. An amphibious boat comprising a boat hull and a pair of retractable wheel assemblies secured adjacent the stern of the boat hull and movable from a locked trailering position with the wheel assemblies supporting the boat hull to a storage position with the wheel assemblies located above the waterline whereby the boat hull can function in a conventional manner without interference from said retractable wheel assemblies, each retractable wheel assembly including a cantilevered arm with one end pivotally secured to said boat hull with the opposite end supporting a wheel of the retractable wheel assembly, each wheel assembly pivotting about a pivotally secured end of the cantilevered arm when moved between the storage position and the trailering position, each wheel assembly including a two part locking mechanism which locks the wheel assembly in the trailering position, said two part locking mechanism including a first part on said retractable wheel assembly and a second part secured to said boat hull and wherein said second part additionally defines a hydrofoil which provides lift to said boat hull when the boat hull is supported by and driven through water at an appropriate speed.

2. An amphibious boat as claimed in claim 1 wherein the cantilevered arm of each retractable wheel assembly is generally upright in said trailering position.

3. An amphibious boat as claimed in claim 1 wherein each wheel assembly includes a spring biased trailing suspension arm.

4. An amphibious boat as claimed in claim 1 wherein said cantilevered arm of each retractable wheel assembly has an associated operating crank handle interior to the boat hull for moving the retractable wheel assembly from the trailering position to the storage position.

5. An amphibious boat as claimed in claim 4 wherein each cantilevered arm includes a pivot shaft passing through a bearing in said boat hull.

6. An amphibious boat as claimed in claim 1 including a trailer tongue at the bow of the boat for engaging a ball hitch.

7. An amphibious boat as claimed in claim 6 wherein said trailer tongue includes a doily wheel for partially supporting the boat in a dolly mode.

8. An amphibious boat as claimed in claim 7 wherein said dolly wheel is pivotally movable to a storage position above said trailer tongue.

9. An amphibious boat comprising a boat hull and a pair of retractable wheel assemblies secured adjacent the stern of the boat hull and movable from a locked trailering position with the wheel assemblies supporting the boat hull to a storage position with the wheel assemblies located such that the boat hull can function in a conventional manner without interference from said retractable wheel assemblies, each retractable wheel assembly including a strut arm with one end pivotally secured to said boat hull with the opposite end supporting a trailing arm having a wheel of the retractable wheel assembly at one end of said trailing arm, each wheel assembly pivotting about a pivotally secured end of the strut arm when moved between the storage and the trailering position, each wheel assembly including a two part locking mechanism which locks the wheel assembly in the trailering position, said two part locking mechanism including a first part on said retractable wheel assembly and a second part secured to said boat hull and wherein said second part is located below and spaced from said pivot connection of said strut arm to provide a strong securement of said strut arm to said boat hull in said trailering position, and wherein said trailing arm includes a suspension connection with said strut arm and said strut arm is held in a fixed position relative to said boat hull when said strut arm is in the trailering position and said second part is in the form of a hydrofoil located to provide lift to the boat hull when driven through the water.

10. An amphibious boat as claimed in claim 9 wherein said second part is secured adjacent the bottom of the boat hull.

11. An amphibious boat as claimed in claim 9 wherein said hydrofoil includes a guide arrangement for guiding said first part to the locked trailering position.

12. An amphibious boat as claimed in claim 11 wherein said guide arrangement also includes a tapered channel having a large mouth portion which receives and guides said first part in said tapered channel to a lock position where said tapered channel also provides a positive structural stop limiting any further movement of said first part further in the direction entering said channel and thereby providing a positive stop mechanism limiting movement of said strut arm.

13. An amphibious boat as claimed in claim 12 wherein said first part includes a spring biased lock pin which engages said second part when said first part is moved to the trailering position and moves upwardly within said first part, said lock pin when said first part is moved to the trailering position entering due to the spring bias and locking with a locking recess in said second part, and including means for releasing said pin from said locking recess.

14. An amphibious boat as claimed in claim 13 wherein said means for releasing is a cable arrangement which is connected to said pin and is secured interior to said boat which can be tensioned for moving of said pin to release the pin form said locking recess.

15. An amphibious boat as claimed in claim 14 wherein each strut is supported in a beating arrangement adjacent a gunwale of the boat hull and includes a corresponding crank arm to the interior of the boat hull which is fixed relative to said strut arm whereby said crank arm can be used for moving said strut arm between the trailering and the storage position.

16. An amphibious boat as claimed in claim 15 including a latch member for each strut arm which cooperates with said locking pin for maintaining said strut arm in said storage position.

17. An amphibious boat as claimed in claim 16 wherein latch member is a plate which engages said locking pin and urges said locking pin against said spring bias until the strut arm reaches the storage position where said locking pin locks with said latch plate.

18. An amphibious boat as claimed in claim 9 including a trailer tongue at the bow of the boat for engaging a ball hitch.

19. An amphibious boat as claimed in claim 18 wherein said trailer tongue includes a dolly wheel for partially supporting the boat in a dolly mode.

* * * * *